United States Patent Office.

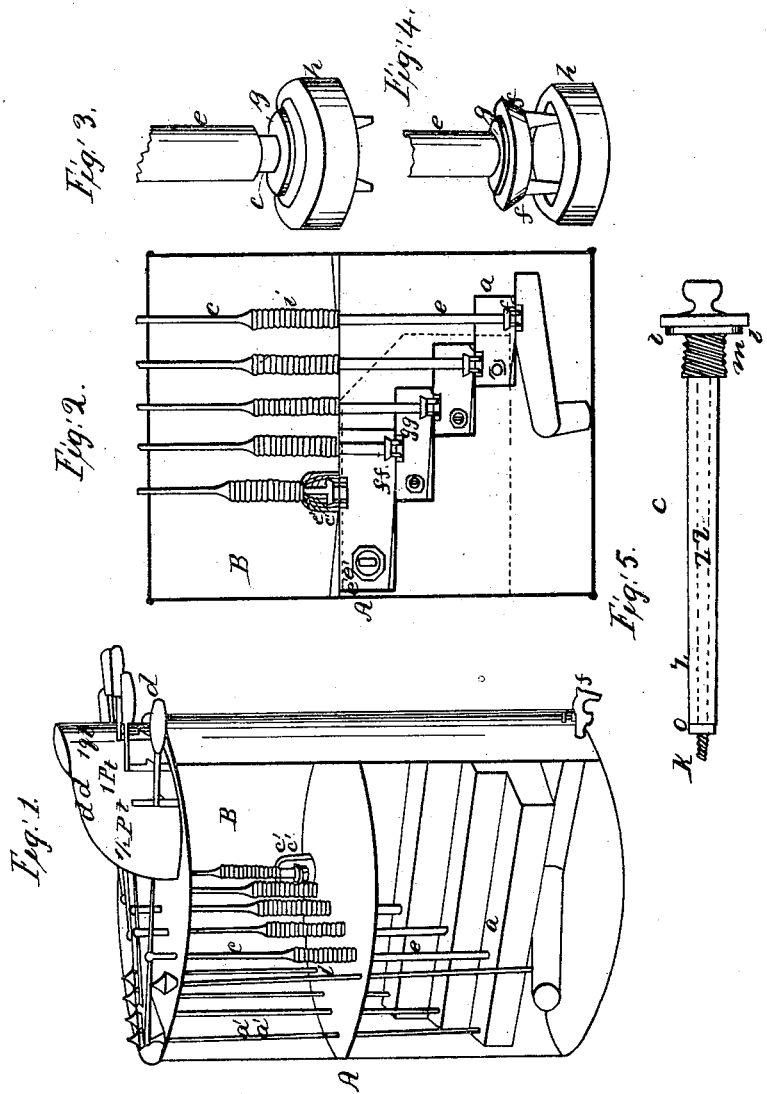

MARTIN McDEVITT, OF HAMPTON, VIRGINIA.

Letters Patent No. 100,307, dated March 1, 1870.

IMPROVEMENT IN LIQUID MEASURES.

The Schedule referred to in these Letters Patent and making part of the same

---

I, MARTIN McDEVITT, of Hampton, in the county of Elizabeth City, and State of Virginia, have invented certain Improvements in Liquid Measures, of which the following is a specification, reference being had to the accompanying drawings and to the letters of reference marked thereon.

My invention relates to an apparatus for measuring liquids, the whole being so arranged that any exact quantity can be drawn from a can by means of the combination of measures within the can, and levers connected with spiral springs and valves, and also tubes and regulator connected with the same.

Description of the Accompanying Drawings.

Figure 1 is a side elevation.

Figure 2 is an end view of the measuring apparatus.

Figures 3, 4, and 5, enlarged views of the valve and regulator.

A represents the can which contains the liquid, and the apparatus for measuring the same.

B, the upper interior apartment which contains the liquid, and which is sealed, or rather soldered, at the base or bottom of said apartment, so no liquid can pass below except through the aperture $c'$ $c'$, and by the use of the lever $d$.

C is a rod connected and attached to the lever $d$, on the outside and top of the can A.

The rod C has attached to it a spiral spring, $i$, which rests on the bottom of the apartment B, and is fastened at each end of the same.

The rod C extends through said apartment, below and into and through the tube E into the measure $a$.

The tube E is stationary, and the upper end of the same is soldered to the bottom of the apartment B, and the lower end extends through the upper part of the measure $a$ and within about one-half inch of the bottom of the same.

To the lower end of the rod C, which passes through said tube, and into the interior of the measure $a$, is attached a valve, $f$, as shown by fig. 4.

Directly beneath the valve is the seat $h$, which is soldered into the base or lower part of the measure $a$, so that the rim or upper part of the seat $h$ only comes to the surface of the bottom of the interior of the measure, and therefore occupying no space in the interior of the measure.

The seat must be constructed of metal, brass being the best material for the same.

The valve attached to the rod C should also be made of metal, though it can be made of leather.

Fig. 4 is a perspective view of the valve $f$ as it is attached to the rod $g$, being a piece of rubber which is slipped over the rod and rests on the top of the valve; and this figure represents a view of the valve when open, or rather when not shut down into the seat $h$.

Fig. 3 is a view of the valve when closed, or when shut down into the seat $h$.

When the valve is open, the top of it, or rather the rubber, is brought securely against the bottom of the tube E, as shown in fig. 4.

By means of the lever $d$ any given quantity of liquid, indicated on the index above each lever, can be drawn from the can by simply pressing down the lever $d$ to the notch just below the lever. The exact quantity indicated just above the lever will immediately pass out at the faucet $f$ by pressing down the said lever.

The liquid passes from the apartment B into the measures below through $c'$ $c'$. In order that this aperture at $c'$ $c'$ may not be obstructed by anything which may be in the liquid, a small wire screen or perforated tin is placed around and over $c'$ $c'$.

Fig. 2 is an end view of the measuring apparatus, exhibiting the manner by which each measure may be regulated to an exact quantity, at any time when it appears to be incorrect.

$e'$ $e'$ is a nut inserted in the end of each measure, with a thread on the inside of it.

C, in fig. 5, is the regulator, which consists of a straight rod, as indicated by the two dotted lines in said figure, at the large end of which is the screw-thread, $m$, so constructed as to screw tightly into the nut $e'$ $e'$, and the shoulder $l$, which is of rubber, adjoining the thread $m$, is screwed tightly against the nut $e$ $e$, thus preventing any liquid escaping.

On the end of this regulator is the thread $k$ and nut $o$, which is arranged so as to screw and hold to its position the thimble $z$, which is inserted over the rod $z$ $z$. This thimble may be large or small, according as it may be necessary to increase or decrease the quantity in each measure.

By means of a door on the outside of the can, covering the ends of each measure, in which is inserted the regulator, the sealer of weights and measures may at any time easily regulate the quantity in each measure to his standard by the use of the regulator, as herein explained, and then seal the end of each measure where the regulator enters at $e'$ $e'$.

The measures, as shown in fig. 1, are constructed one above the other, like stair-steps, and the inside of each is so arranged by slips of tin being soldered on the edge and extending toward the seat $g$ $g$, as shown in fig. 2, that the liquid runs rapidly toward the seat and out the faucet $f$.

Each measure has a vent which extends to the top and outside of the can A, as shown by $a'$ $a'$, and on the top of the vent is a cap which prevents the forcing of the liquid out of the can, or the vents may be made to come within about one-quarter of an inch of the upper surface of the can, and directly over each vent a small slide may be so made that in case the vents need cleaning, it may be easily done by removing the slide.

In fig. 1, a slide or door is so constructed as to give access to the entire part of the can A below the apartment B, so that in case repairs are necessary, the work may be easily done without delay or injuring the can, and the measures can be so constructed on my principle as to allow any required quantity of liquid to be drawn, in the manner herein explained.

*Claims.*

1. In combination with the several measuring-chambers $a$, provided with the valve-seats $h$ and vents $a'$ $a'$, the tubes E, rods $c$, with valves $f$ $f$, and springs $i$, the same being connected with and operated by the indicating levers $d$, substantially as described.

2. In combination with the measuring-chambers $a$, the screw-headed regulator $c$ fitting into the seat or nut $e'$ $e'$, substantially as and for the purpose described.

Witnesses:    MARTIN McDEVITT. [L. S.]
  C. G. WILLARD,
  A. GRANT.